No. 882,384. PATENTED MAR. 17, 1908.
N. D. HANSEN.
LOADING APPARATUS.
APPLICATION FILED JAN. 29, 1907.

3 SHEETS—SHEET 1.

Witnesses
Inventor
Nels D. Hansen
By
Attorneys

No. 882,384. PATENTED MAR. 17, 1908.
N. D. HANSEN.
LOADING APPARATUS.
APPLICATION FILED JAN. 29, 1907.

3 SHEETS—SHEET 2.

No. 882,384. PATENTED MAR. 17, 1908.
N. D. HANSEN.
LOADING APPARATUS.
APPLICATION FILED JAN. 29, 1907.
3 SHEETS—SHEET 3.
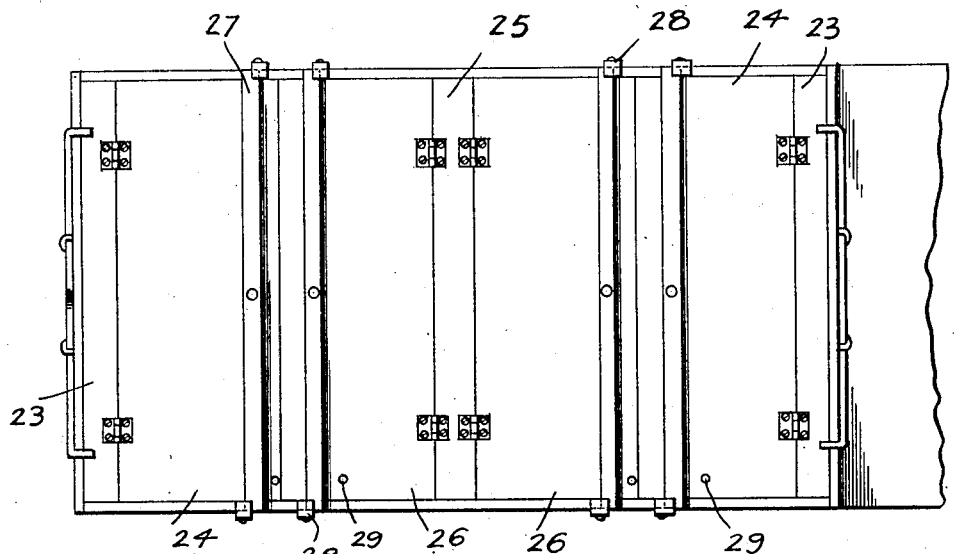
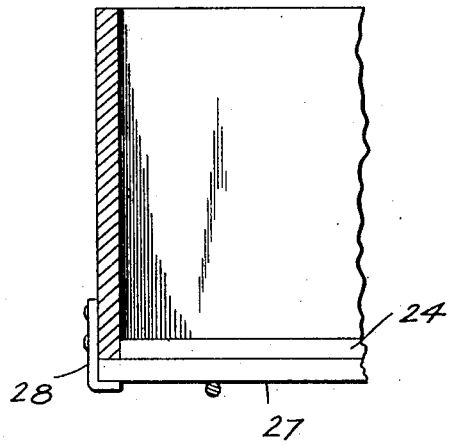
Witnesses
Inventor
Nels D. Hansen
By
Attorneys

UNITED STATES PATENT OFFICE.

NELS D. HANSEN, OF FAIRFAX, SOUTH DAKOTA.

LOADING APPARATUS.

No. 882,384.         Specification of Letters Patent.      Patented March 17, 1908.

Application filed January 29, 1907.   Serial No. 354,649.

*To all whom it may concern:*

Be it known that I, NELS D. HANSEN, a citizen of the United States, residing at Fairfax, in the county of Gregory, State of South Dakota, have invented certain new and useful Improvements in Loading Apparatus; and I do hereby declare the following to be a full, clear, and exact description of the invention, such as will enable others skilled in the art to which it appertains to make and use the same.

This invention relates to loading apparatus and more particularly to an apparatus for loading material, such as fertilizer or dirt into a wagon, and the apparatus consists broadly speaking, in a frame beneath which is suspended a box into which the material to be loaded into a wagon is placed, there being suitable block and tackle devices for raising and lowering the box at a small expenditure of power.

While a number of such devices have been patented, they are so constructed that the entire contents of the box is dumped at one operation into the wagon, and in case stones or dirt is the material being loaded, it frequently happens that the entire bottom or bed of the wagon is broken out. I obviate this by providing a construction of dumping box which will dump substantially one fourth of its contents at a time, thus greatly minimizing the force of impact upon the wagon bed.

Figure 1:
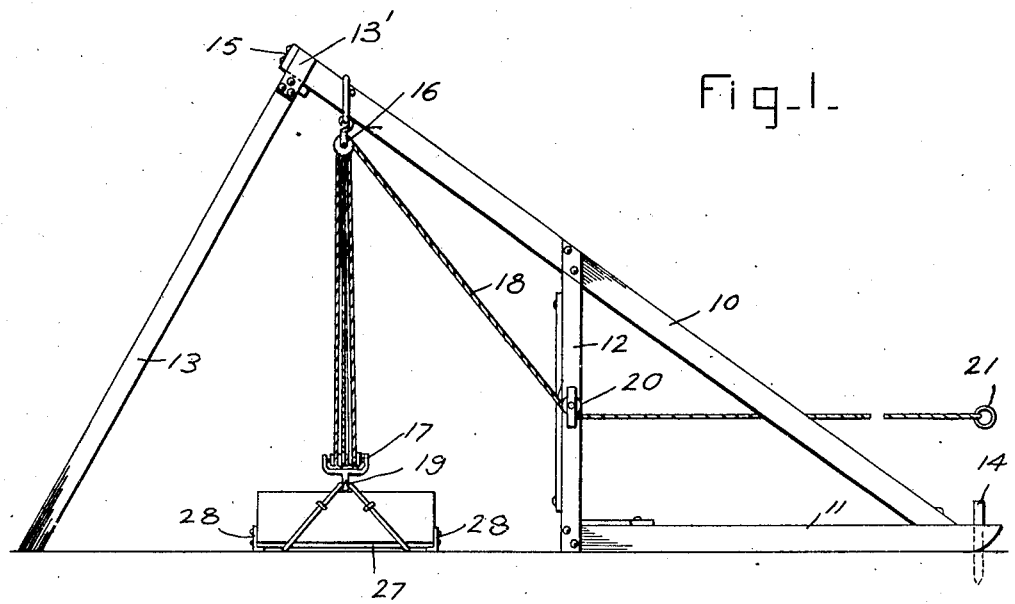
Figure 2:
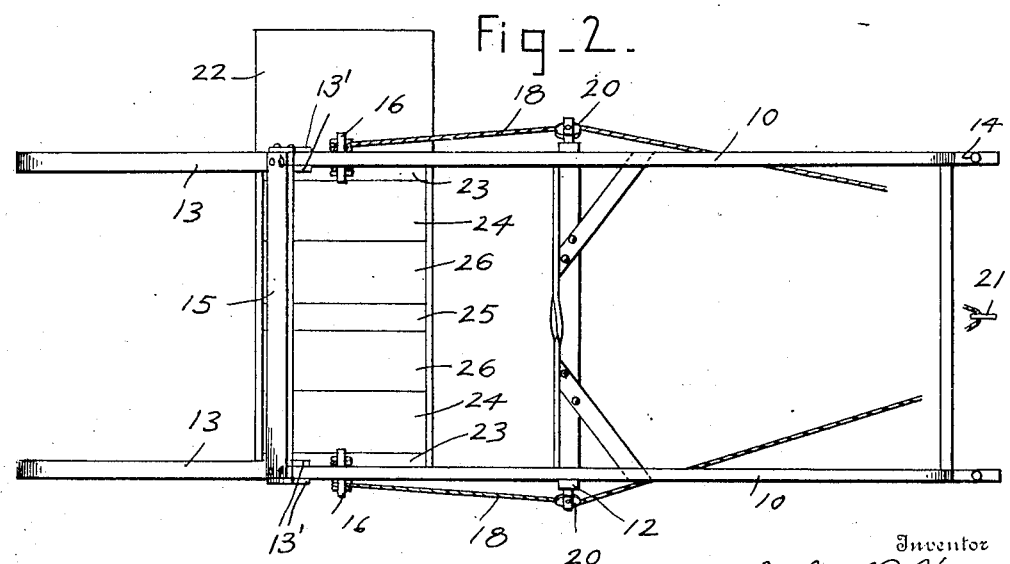
Figure 3:
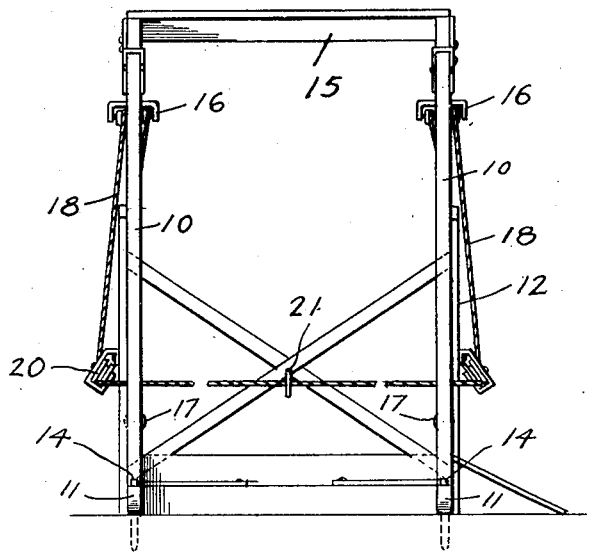
Figure 4:
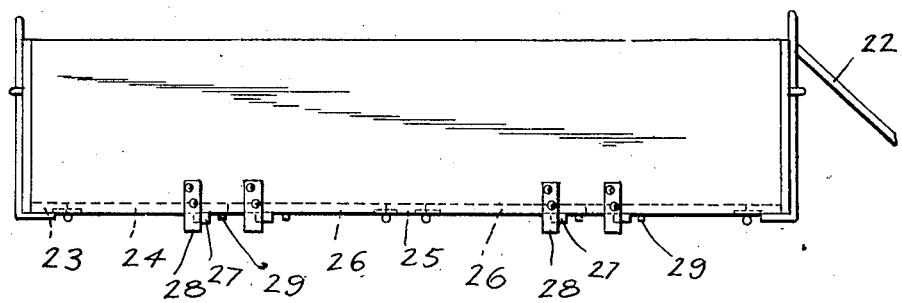

In the accompanying drawings, Figure 1 is a side elevation of a loading apparatus constructed in accordance with my invention. Fig. 2 is a top plan view thereof. Fig. 3 is an end elevation. Fig. 4 is a side elevation of the loading or dumping box of the apparatus. Fig. 5 is a detail bottom plan view thereof. Fig. 6 is a detail vertical longitudinal sectional view therethrough.

Referring more specifically to the drawings, the apparatus is shown as comprising a frame including side sills 10, which are suitably braced and are secured at their lower ends each to a runner 11, the said side sills being held in inclined position upon the runners by means of vertical braces or uprights 12, and being supported additionally by means of uprights 13 which are detachably connected at their upper ends by means of cleats 13' with the upper ends of the side sills 10, the detachable connection serving to permit the frame to be knocked down. The runners 11 as well as the uprights 13 are suitably braced as will be readily understood, and in order to prevent slipping of the frame while the apparatus is in use, spurs 14 are carried by the runners 11, and dig into the ground for the purpose stated.

A beam 15 serves to connect the upper end portions of the side sills 10, and from the side sills are suspended pulleys 16, over which and similar pulleys 17 are engaged continuous cables 18. The pulleys 17 are each provided with a hook 19, which is engaged with a hanger carried by the dumping box of the apparatus. These hangers which are secured to the ends of the box are formed each of a rod bent upon itself at its middle and secured at its ends to the box as stated. The cables 18 are engaged beneath pulleys 20 carried upon the uprights 12, and are connected with a ring 21, with which may be connected a swingle tree (not shown).

The box above mentioned, is open at its top, and has its bottom closed by a number of hinged doors which will be presently explained, and hinged at its upper end to one end of the box is a board 22, which is adapted to rest at an angle and with its lower edge upon the ground when the box is lowered to serve as a platform upon which the scraper or drag may be run, it being understood that this scraper or drag may be of any construction and is used to gather the stones or dirt and convey it to the loading apparatus.

Extending across the bottom of the box at each end thereof, is a cleat 23, and to each of these cleats is hinged a door 24. A similar cleat 25 extends across the middle of the box and to it are hinged doors 26. These doors are all adapted to swing downwardly and in order to hold them in position to close the bottom of the box, a cleat 27 is pivoted at its middle upon each of the doors, and is adapted to have its ends swung into engagement with suitable keepers 28 carried by the under edges of the sides of the box. These keepers are preferably formed of strapped iron and have each an attaching portion which is secured to the outer face of one side of the box, and a portion which is bent inwardly at right angles beneath the box.

It will be observed that as four of these doors are provided, and that as four retaining devices are used, one for each door, the doors may be opened successively thereby discharging but a portion of the contents of the box at a time, and it will be further understood that it is only necessary to lightly tap one end of each cleat to cause it to swing out of engagement with its keeper and permit dropping of the respective door. In order to prevent the cleats from swinging to too great a degree, stop pins 29 are provided as suitable points upon the doors, and serve to limit the movement of the cleats.

What is claimed is:

1. An apparatus of the class described comprising a frame including inclined side sills, pulleys suspended from the side sills, a dumping box having a bottom formed of a plurality of hinged doors, hangers secured to the ends of the box, pulleys connected with the hangers, and a cable having one stretch engaged over the first and last mentioned pulleys at one side of the frame and box and its other stretch engaged over the corresponding pulleys at the other side of the frame and box.

2. A dumping box for an apparatus of the class described including a bottom comprised of transverse fixed cleats, doors hinged to the cleats in opposition with respect to each other, cleats pivoted upon the doors adjacent their free edges, and keepers secured to the sides of the box and extending therebeneath and in position for engagement therewith of the ends of the pivoted cleats, whereby the doors may be normally held closed.

3. A dumping box for an apparatus of the class described including a bottom comprised of transverse fixed cleats, doors hinged to the cleats in opposition with respect to each other, cleats pivoted upon the doors adjacent their free edges, keepers secured to the sides of the box and extending therebeneath and in position for engagement therewith of the ends of the pivoted cleats, whereby the doors may be normally held closed, and means for limiting the swinging movement of said pivoted cleats.

In testimony whereof, I affix my signature, in presence of two witnesses.

NELS D. HANSEN.

Witnesses:
A. B. CUTHBERTSON.
R. R. VAZEN.